(12) United States Patent
Horovitz (10) Patent No.: US 8,096,569 B2
(45) Date of Patent: Jan. 17, 2012

(54) CONVERTIBLE CYCLING-STROLLER APPARATUS

(76) Inventor: Emil Horovitz, West Windsor, NJ (US)

( * ) Notice: Subject to any disclaimer, the term of this patent is extended or adjusted under 35 U.S.C. 154(b) by 0 days.

(21) Appl. No.: 12/886,150

(22) Filed: Sep. 20, 2010

(65) Prior Publication Data

US 2011/0068561 A1 Mar. 24, 2011

Related U.S. Application Data

(60) Provisional application No. 61/277,222, filed on Sep. 21, 2009.

(51) Int. Cl.
*B62K 13/00* (2006.01)

(52) U.S. Cl. .................. 280/287; 280/7.17; 280/31

(58) Field of Classification Search .................. 280/282, 280/292, 304.5, 31, 30, 287, 278, 642, 643, 280/648, 658, 7.17, 7.1, 7.15

See application file for complete search history.

(56) References Cited

U.S. PATENT DOCUMENTS

| 5,562,300 | A | * | 10/1996 | Nelson | 280/655.1 |
| 5,863,058 | A | * | 1/1999 | Jinks | 280/202 |
| 6,443,469 | B1 | * | 9/2002 | Cross et al. | 280/47.4 |
| 7,249,779 | B2 | * | 7/2007 | Ehrenreich et al. | 280/643 |
| 7,490,844 | B2 | * | 2/2009 | Barak et al. | 280/287 |
| 7,780,184 | B2 | * | 8/2010 | Ehrenreich et al. | 280/648 |
| 2007/0057483 | A1 | | 3/2007 | Barak et al. | |
| 2008/0217875 | A1 | | 9/2008 | Barak et al. | |
| 2009/0072520 | A1 | | 3/2009 | Ehrenreich et al. | |

FOREIGN PATENT DOCUMENTS

| JP | 2005-088606 | 4/2005 |
| JP | 2005-119450 | 5/2005 |
| WO | WO 2007/031987 | 3/2007 |

\* cited by examiner

*Primary Examiner* — Paul N Dickson
*Assistant Examiner* — Tashiana Adams
(74) *Attorney, Agent, or Firm* — Terra Nova Patent Law, PLLC; Mitchell A. Rossman (57) ABSTRACT

A convertible cycling-stroller apparatus is provided. The convertible cycling-stroller apparatus includes a two-part frame; at least one wheel each rotably mounted on the at least one axle on the first frame; at least one wheel each rotably mounted on the at least one axle on the second frame; a riding seat; a drive mechanism; at least one handlebar post attached to the first frame; and a carrier attachable to the first frame.

20 Claims, 8 Drawing Sheets

CONVERTIBLE CYCLING-STROLLER APPARATUS

RELATED APPLICATIONS

This application claims priority to U.S. Provisional Patent Application Ser. No. 61/277,222 filed Sep. 21, 2009, which is hereby incorporated by reference in its entirety for all purposes.

BACKGROUND OF THE INVENTION

A wide variety of human tricycles are commercially available. Tricycles typically follow three layouts. An upright tricycle resembles a two-wheel bicycle but with two wheels at the back and the rider straddling the frame. The upright tricycle is steered through a handlebar directly connected to the front wheel. A delta tricycle is similar to an upright tricycle, but has a recumbent layout in which the rider is seated in a chair-like seat, one or both rear wheels can be driven, while the front is used typically for steering. The delta tricycle is steered either through a linkage, with the handlebars under the seat or directly to the front wheel with a large handlebar. A tadpole, or a reverse trike, has a recumbent design with two steered wheels at the front and one driven wheel at the back. The tadpole trike is steered through a single handlebar linked with tie rods to the front wheel stub axle assemblies or with two handlebars each bolted to a steering tube, usually through a bicycle-type headset and connected to a stub axle assembly.

The main advantages of tricycles over a standard bicycle are stability and safety. The three wheels in a tricycle, instead of two, enables the rider to load extra weight on the tricycle, such as small children and/or shopping bags, and to maintain the child and/or bags on the tricycle without risk of falling, even when the tricycle is at a full stop. However, tricycles are quite large vehicles. Their large size makes it difficult to use them indoors, on busses, or on trains.

On the other hand, a stroller is convenient for transporting a child and/or a package in a confined space, such as an indoor location, a bus, or a train.

What is needed is a convertible cycling-stroller apparatus that combines the benefits of a tricycle with the benefits of a stroller.

SUMMARY OF THE INVENTION

The convertible cycling-stroller apparatus, as described herein, is a cycling apparatus that can easily be converted into a stroller. The convertible cycling-stroller apparatus may be a tricycle or quadrocycle with a contractible wheel base. The convertible cycling-stroller apparatus can carry a child and/or a shopping basket. The convertible cycling-stroller apparatus can be converted into a stroller or a shopping cart, and can be steered like a stroller or a shopping cart. The cycling apparatus can also be folded or disassembled for transportation in a standard-size car trunk or storage in a box or closet. The convertible cycling-stroller apparatus may be human-powered or may be powered (e.g., electric or fuel powered) by an engine or motor.

The convertible cycling-stroller apparatus can be used in many situations. For example, a rider can drive the tricycle or quadrocycle from home to a shopping mall with a child. Upon reaching the shopping mall, the tricycle or quadrocycle can be quickly converted to a stroller. The rider can easily enter the building while pushing the stroller, without being required to leave the tricycle or quadrocycle outside. In a similar fashion, a person can ride the tricycle or quadrocycle to a supermarket, convert the tricycle or quadrocycle into a shopping cart, use the shopping cart to collect groceries, leave the supermarket, convert the shopping cart into a tricycle or quadrocycle, and ride back home with the groceries.

The convertible cycling-stroller apparatus provides many advantages over the existing designs including, for example, easy maneuverability on crowded streets, bus, trains, and buildings. The convertible cycling-stroller apparatus can be converted from the tricycle or quadrocycle to a stroller or from a stroller to a tricycle or quadrocycle in a few seconds, without the need to disassemble the cycling-stroller apparatus or removing the child and/or package during the conversion process. The convertible cycling-stroller apparatus also provides the rider/walker with good exercise or can easily be outfitted with a motor to propel the cycling-stroller apparatus. In either human-powered or motor-powered mode, the cycling-stroller apparatus allows the ride to travel in an environmentally friendly way. The design of the cycling-stroller apparatus is also very simple and elegant, which allows for a low-cost product. When the drive mechanism utilizes a chainless shaft, the risk of clothing or hair being caught in the drive mechanism is eliminated.

The present invention provides a vehicle. The vehicle includes a two-part frame including a first frame and a second frame, wherein the first frame and the second frame are separated by at least one swivel that allows for a side-to-side motion with respect to the longitudinal axis of the two-part frame, wherein the second frame includes a member movable between a non-extended orientation and an extended orientation on the second frame or a member movable between a non-extended orientation and an extended orientation in a cavity or a guide on the first frame; at least one wheel each rotably mounted on the at least one axle on the first frame; at least one wheel each rotably mounted on the at least one axle on the second frame; a riding seat reversibly attached to the second frame; a drive mechanism coupled to the at least one wheel each rotably mounted on the at least one axle on the first frame or to the at least one wheel each rotably mounted on the at least one axle on the second frame for driving the vehicle; at least one handlebar post attached to the first frame; and a carrier attachable to the first frame for carrying at least one human, at least one package, or a combination thereof therein, wherein the vehicle is in a tricycle orientation when the member is in the extended orientation and is drivable by a rider sitting on the seat and steering the vehicle with the at least one handlebar post, wherein the vehicle is in a stroller orientation when the member is in the non-extended orientation and is drivable by a walker steering the vehicle with the at least one handlebar post.

In one embodiment, the carrier is movable between a forward-facing orientation and a rear-facing orientation with respect to the longitudinal axis of the first frame. In another embodiment, the carrier is in a forward-facing orientation with respect to the longitudinal axis of the first frame when the vehicle is in the tricycle orientation. In yet another embodiment, the carrier is in a forward-facing orientation with respect to the longitudinal axis of the first frame when the vehicle is in the stroller orientation.

In one embodiment, the carrier is in a rear-facing orientation with respect to the longitudinal axis of the first frame when the vehicle is in the tricycle orientation. In another embodiment, the carrier is in a rear-facing orientation with respect to the longitudinal axis of the first frame when the vehicle is in the stroller orientation. In yet another embodiment, the carrier is in a forward-facing orientation with respect to the longitudinal axis of the first frame when the vehicle is in both the tricycle orientation and the stroller orientation. In still yet another embodiment, the carrier is in a rear-facing orientation with respect to the longitudinal axis of the first frame when the vehicle is in the tricycle orientation and in a forward-facing orientation with respect to the longitudinal axis of the first frame when the vehicle is in the stroller orientation.

In one embodiment, the carrier is in a rear-facing orientation with respect to the longitudinal axis of the first frame when the vehicle is in both the tricycle orientation and the stroller orientation. In another embodiment, the carrier is in a forward-facing orientation with respect to the longitudinal axis of the first frame when the vehicle is in the tricycle orientation and in a rear-facing orientation with respect to the longitudinal axis of the first frame when the vehicle is in the stroller orientation. In yet another embodiment, the vehicle further includes one or more adjustable canopies extendable over the carrier, the rider, the walker, or a combination thereof.

In one embodiment, the vehicle in the tricycle orientation is steered by turning the first frame on the at least one swivel. In another embodiment, the vehicle in the stroller orientation is steered by depressing on the handlebar, lifting the front wheel, and turning the vehicle in the desired direction.

In one embodiment, the drive mechanism is a chainless shaft including a variable speed transmission. In one embodiment, the variable speed transmission includes a three speed transmission.

In another embodiment, the drive mechanism is a chainless shaft including a single speed transmission. In yet another embodiment, the drive mechanism includes at least one chain ring, at least one chain, and at least one gear operationally connected with each other to power the vehicle.

In one embodiment, the drive mechanism includes at least one pulley, at least one belt, and at least one gear operationally connected to each other to power the vehicle. In another embodiment, the drive mechanism is coupled to the at least one wheel each rotably mounted on the at least one axle on the second frame for driving the vehicle. In yet another embodiment, the drive mechanism is coupled to the at least one wheel each rotably mounted on the at least one axle on the first frame for driving the vehicle.

In one embodiment, the drive mechanism is coupled to both the at least one wheel each rotably mounted on the at least one axle on the first frame and the at least one wheel each rotably mounted on the at least one axle on the second frame for driving the vehicle. In another embodiment, the drive mechanism is human-powered. In yet another embodiment, the drive mechanism is non-human powered.

In one embodiment, the drive mechanism is powered by an electric motor powered by a battery. In another embodiment, the drive mechanism is powered by an internal combustion engine. In yet another embodiment, the internal combustion engine is powered by burning propane.

In one embodiment, the at least one handlebar post attached to the first frame includes a single handlebar with two individual mounting posts separated by a space, wherein at least a portion of the carrier is disposed in the space between the two individual mounting posts. In another embodiment, the at least one handlebar post includes two individual mounting posts separated by a space, wherein at least a portion of the carrier is disposed in the space between the two individual mounting posts. In yet another embodiment, the at least one handlebar post attached to the first frame includes one or more control devices for actuating at least one first brake on the at least one wheel each rotably mounted on at least one axle on the first frame, at least one second brake on the at least one wheel each rotably mounted on at least one axle on the second frame, or a combination thereof.

In one embodiment, the at least one handlebar post attached to the first frame includes a gear adjustor which change a gear ration of a drive mechanism with the proviso that the gear adjustor is absent if the drive mechanism includes a single speed transmission. In another embodiment, the drive mechanism includes an internal gear hub, and wherein the gear adjustor communicates with an internal gear hub to change the gear ratio of the drive mechanism. In yet another embodiment, the drive mechanism includes a derailleur, and wherein the gear adjustor communicates with the derailleur to change the gear ratio of the drive mechanism.

In one embodiment, the at least one handlebar post attached to the first frame further includes a locking mechanism to releasably lock the at least one handlebar post to the first frame in an upright orientation relative to the longitudinal axis of the first frame. In another embodiment, the two-part frame is foldable to a compact orientation. In yet another embodiment, the vehicle in the tricycle orientation includes two front wheels each rotably mounted on the at least one axle on the first frame and one wheel each rotably mounted on the at least one axle on the second frame.

In one embodiment, the vehicle in the stroller orientation includes two front wheels each rotably mounted on the at least one axle on the first frame and one wheel rotably mounted on the at least one axle on the second frame. In another embodiment, the distance between the at least one wheel each rotably mounted on the at least one axle on the first frame and the at least one wheel each rotably mounted on the at least one axle on the second frame changes when member is moved between the non-extended orientation of the stroller orientation to the extended orientation of the tricycle orientation. In yet another embodiment, the at least one handlebar post spatially translates with respect to the longitudinal axis of the first frame between the tricycle orientation and the stroller orientation.

In one embodiment, the member is movable between the non-extended orientation and the extended orientation on the second frame by hand or with the assistance of a mechanical device. In another embodiment, the mechanical device is a rack and pinion.

In one embodiment, the member is movable between the non-extended orientation and the extended orientation in the cavity or the guide on the first frame by hand or with the assistance of a mechanical device. In another embodiment, the mechanical device is a rack and pinion.

In one embodiment, the at least one swivel that allows for a side-to-side motion with respect to the longitudinal axis of the two-part frame does not allow for an up-or-down motion with respect to the longitudinal axis of the two-part frame when moving from extended orientation to the non-extended orientation.

The present invention also provides a convertible cycling-stroller apparatus. The convertible cycling-stroller apparatus includes a two-part frame including a first frame and a second frame, wherein the first frame and the second frame are separated by at least one swivel that allows for a side-to-side motion with respect to the longitudinal axis of the two-part frame, wherein the second frame includes a member movable between a non-extended orientation and an extended orientation on the second frame or a member movable between a non-extended orientation and an extended orientation in a cavity or a guide on the first frame; at least one wheel each rotably mounted on at least one axle on the first frame; at least one wheel each rotably mounted on at least one axle on the second frame; a riding seat reversibly attached to the second frame; a drive mechanism coupled to the at least one wheel each rotably mounted on the at least one axle on the second frame for driving the convertible cycling-stroller apparatus, wherein the drive mechanism is a chainless shaft including a variable speed transmission; at least one handlebar post attached to the first frame; and a carrier attachable to the first frame for carrying at least one human, at least one package, or a combination thereof therein, wherein the convertible cycling-stroller apparatus is in a tricycle orientation when the member is in the extended orientation and is drivable by a rider sitting on the seat, powering the drive mechanism, and steering the convertible cycling-stroller apparatus with the at least one handlebar post, wherein the convertible cycling-stroller apparatus is in a stroller orientation when the member is in the non-extended orientation and is drivable by a walker steering the convertible cycling-stroller apparatus with the at least one handlebar post.

In one embodiment, the carrier is in a forward-facing orientation with respect to the longitudinal axis of the first frame when the convertible cycling-stroller apparatus is in both the tricycle orientation and the stroller orientation. In another embodiment, the convertible cycling-stroller apparatus in the tricycle orientation is steered by turning the first frame on the at least one swivel. In yet another embodiment, the at least one handlebar post attached to the first frame includes a single handlebar with two individual mounting posts separated by a space, wherein at least a portion of the carrier is disposed in the space between the two individual mounting posts.

In one embodiment, the two-part frame is foldable to a compact orientation. In another embodiment, the convertible cycling-stroller apparatus includes two front wheels each rotably mounted on the at least one axle on the first frame and one wheel rotably mounted on the at least one axle on the second frame. In yet another embodiment, the at least one handlebar post spatially translates with respect to the longitudinal axis of the first frame between the tricycle orientation and the stroller orientation.

In one embodiment, the member is movable between the non-extended orientation and the extended orientation on the second frame. In another embodiment, the member is movable between the non-extended orientation and the extended orientation in the cavity or the guide on the first frame.

In one embodiment, the at least one swivel that allows for a side-to-side motion with respect to the longitudinal axis of the two-part frame does not allow for an up-or-down motion with respect to the longitudinal axis of the two-part frame when moving from extended orientation to the non-extended orientation.

The present invention also provides a convertible tricycle-stroller apparatus. The convertible tricycle-stroller apparatus includes:

a two-part frame including a first frame and a second frame, wherein the first frame and the second frame are separated by at least one swivel that allows for a side-to-side motion with respect to the longitudinal axis of the two-part frame, wherein the second frame includes a member movable between a non-extended orientation and an extended orientation on the second frame or a member movable between a non-extended orientation and an extended orientation in a cavity or a guide on the first frame;

at least one wheel each rotably mounted on at least one axle on the first frame;

at least one wheel each rotably mounted on at least one axle on the second frame;

a riding seat reversibly attached to the second frame;

a drive mechanism coupled to the at least one wheel each rotably mounted on the at least one axle on the second frame for driving the convertible tricycle-stroller apparatus, wherein the drive mechanism is a chainless shaft including a variable speed transmission;

at least one handlebar post attached to the first frame; and a carrier attachable to the first frame for carrying at least one human, at least one package, or a combination thereof therein, wherein the convertible tricycle-stroller apparatus is in a tricycle orientation when the member is in the extended orientation and is drivable by a rider sitting on the seat, powering the drive mechanism, and steering the convertible tricycle-stroller apparatus with the at least one handlebar post, wherein the convertible tricycle-stroller apparatus is in a stroller orientation when the member is in the non-extended orientation and is drivable by a walker steering the convertible tricycle-stroller apparatus with the at least one handlebar post, wherein the convertible tricycle-stroller apparatus in the tricycle orientation is steered by turning the first frame on the at least one swivel, wherein the at least one handlebar post attached to the first frame includes a single handlebar with two individual mounting posts separated by a space, wherein at least a portion of the carrier is disposed in the space between the two individual mounting posts, wherein the convertible tricycle-stroller apparatus includes two front wheels each rotably mounted on the at least one axle on the first frame and one wheel rotably mounted on the at least one axle on the second frame, wherein the at least one swivel that allows for a side-to-side motion with respect to the longitudinal axis of the two-part frame does not allow for an up-or-down motion with respect to the longitudinal axis of the two-part frame when moving from extended orientation to the non-extended orientation.

In one embodiment, the member is movable between the non-extended orientation and the extended orientation in the cavity or the guide on the first frame by hand or with the assistance of a mechanical device.

BRIEF DESCRIPTION OF THE DRAWINGS

Embodiments of the invention may be best understood by referring to the following description and accompanying drawings, which illustrate such embodiments. In the drawings.

The drawings are not necessarily to scale. Like numbers used in the figures refer to like components, steps and the like. However, it will be understood that the use of a number to refer to a component in a given figure is not intended to limit the component in another figure labeled with the same number.

DETAILED DESCRIPTION OF THE INVENTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

The referenced items are provided solely for their disclosure prior to the filing date of the present application. Nothing herein is to be construed as an admission that the present invention is not entitled to antedate such material by virtue of prior invention.

Unless otherwise indicated, the words and phrases presented in this document have their ordinary meanings to one of skill in the art. Such ordinary meanings can be obtained by reference to their use in the art and by reference to general and scientific dictionaries, for example, *Webster's Third New International Dictionary*, Merriam-Webster Inc., Springfield, Mass., 1993, and *The American Heritage Dictionary of the English Language*, Houghton Mifflin, Boston Mass., 1981.

The following explanations of certain terms are meant to be illustrative rather than exhaustive. These terms have their ordinary meanings given by usage in the art and in addition include the following explanations.

As used herein, the term "about" refers to a variation of 10 percent of the value specified; for example about 50 percent carries a variation from 45 to 55 percent.

As used herein, the term "and/or" refers to any one of the items, any combination of the items, or all of the items with which this term is associated.

As used herein, the singular forms "a," "an," and "the" include plural reference unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative apparatus. These terms are not meant to limit the element which they describe, as the various elements may be oriented differently in various applications.

Figure 1:
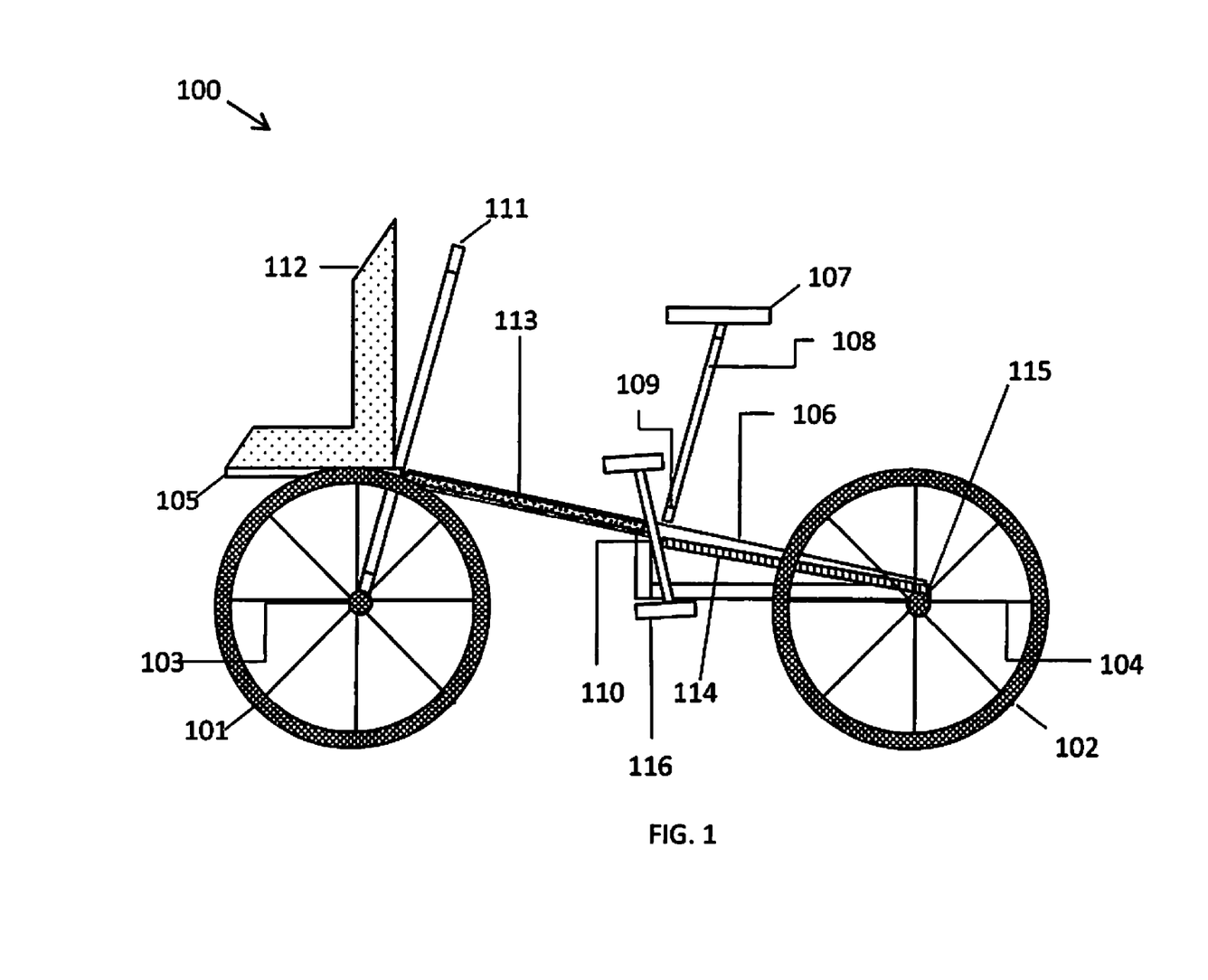
FIG. 1 is a side-view drawing illustrating an exemplary convertible cycling-stroller apparatus in travel mode.

FIG. 1 is a side-view drawing illustrating an exemplary convertible cycling-stroller apparatus 100 in travel mode. The convertible cycling-stroller apparatus 100 includes one or more wheels 101 and one or more wheels 102 each rotatably mounted on axle 103 and axle 104, respectively. Axle 103 is attached to the frame 105. Axle 104 is attached to the frame 106. For example, the convertible cycling-stroller apparatus 100 may be configured as a tricycle with two wheels 101 and one wheel 102, or alternatively, as a tricycle with one wheel 101 and two wheels 102, or as another alternative, as a quadrocycle with two wheels 101 and two wheels 102. The one or more wheels 101 and one or more wheels 102 may be of the same size diameter. In other embodiments, the one or more wheels 101 and one or more wheels 102 may be of the different sizes. The one or more wheels 101 and one or more wheels 102 may be, for example, 16, 20, 26, or 29 inches or larger in diameter, all of which are well known in the art and are commercially available. Typically, the wheels will include inflatable tires (not shown) that may be, for example, ½, 1, 2, 3, or 4 inches or larger in width, all of which are well known in the art and are commercially available.

A riding seat 107 may be attached to frame 106, such as by means of a seat post 108 slidingly mounted on a tube 109, as is extremely well known in the art. A drive mechanism 110 is coupled to one or more of the wheels 101 or 102 for driving the cycling apparatus, such as a pedal, gear, and chain drive, which is extremely well known in the art.

One or more handlebar posts 111 may be attached to a portion of frame 105, which are movable between the first and the second attachment orientations. The handlebar post 111 may be journaled in a handlebar post tube (not shown), as is known in the art. A carrier 112 may be attached to frame 105 or to handlebar post 111 for carrying a child and/or an object (e.g., carrier 112 may be a child seat, a shopping container, a flatbed, or a combination thereof). There may be at least one handlebar post 111 attached to the frame 105 that includes a single handlebar 111 with two individual mounting posts (not shown) separated by a space, wherein at least a portion of the carrier 112 is disposed in the space between the two individual mounting posts.

The carrier 112 may also include an adjustable canopy (not shown) extendable over the carrier 112. In the embodiment shown in FIG. 1, the carrier 112 is in a forward-facing orientation with respect to the longitudinal axis of the frame 105 when the convertible cycling-stroller apparatus 100 is in the tricycle orientation. The carrier 112 may be movable between a forward-facing orientation and rear-facing orientation with respect to the longitudinal axis of the frame 105.

Frame 105 and frame 106 are connected by a swivel (not shown). The frame 106 includes an extendable member 113. When the convertible cycling-stroller apparatus 100 is in the tricycle mode as shown in FIG. 1, the extendable member 113 is fully extended. The extendable member 113 may be extended and non-extended, for example, by hand or with the assistance of a mechanical device (e.g., a rack and pinion).

The convertible cycling-stroller apparatus 100 also includes a drive mechanism 110 that includes a chainless shaft 114 including a variable speed transmission 115.

The convertible cycling-stroller apparatus 100 in FIG. 1 is in a rider-powered orientation powered by a rider (not shown) sitting on seat 107 and powering the drive mechanism 110 by spinning the pedals 116, as is typically done with a regular diamond frame bicycle or tricycle. The pedals 116 may be typical flat bicycle pedals, downhill-type pedals with protruding spikes, clip-less pedals, or cage-type pedals, all of which are well known in the art and are commercially available. The swivel (not shown) at the intersection of the frame 105 and the frame 106 provides for steering of the convertible cycling-stroller apparatus 100.

Figure 2:
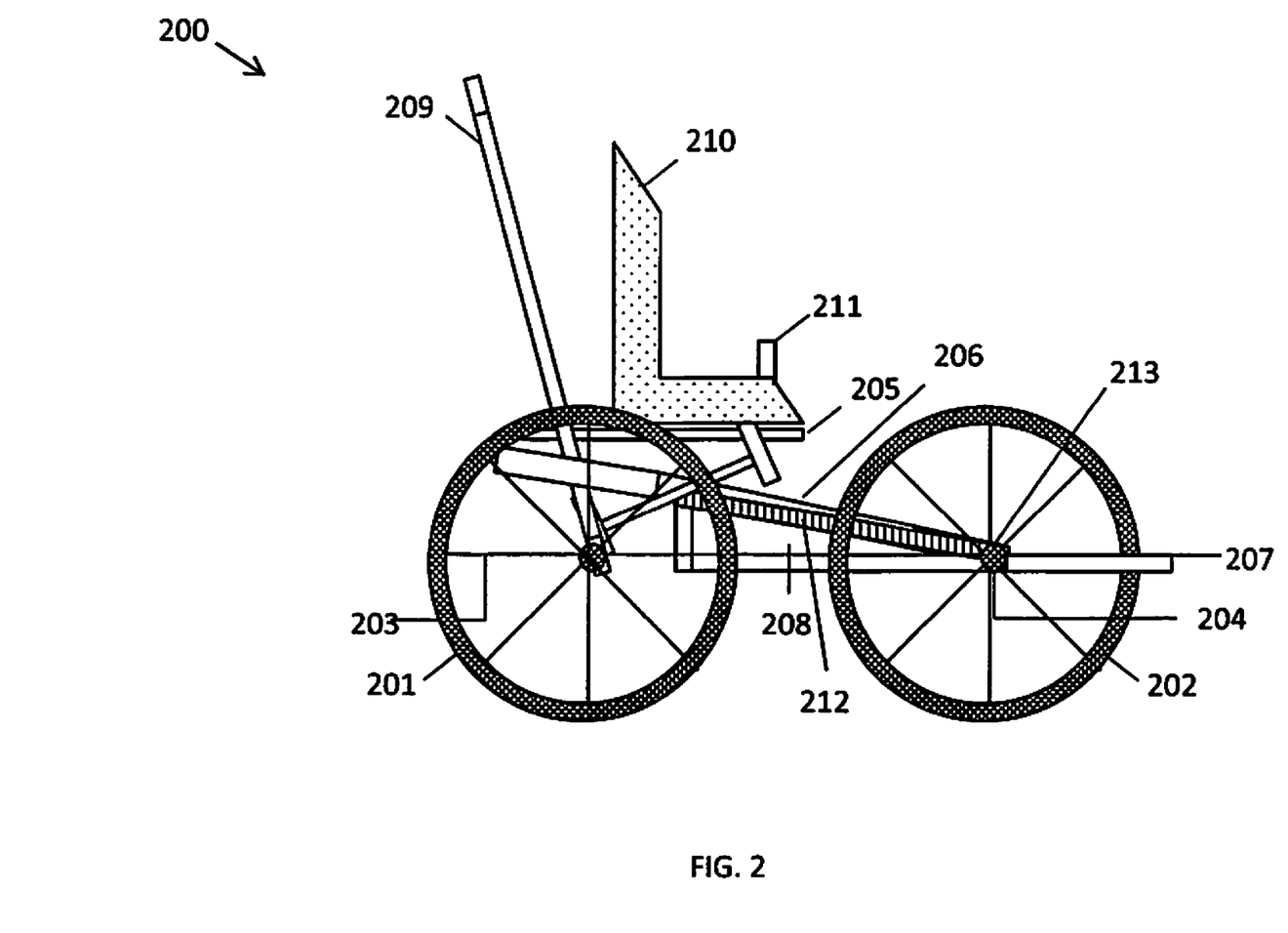
FIG. 2 is a side-view drawing illustrating an exemplary convertible cycling-stroller apparatus in stroller mode.

FIG. 2 is a side-view drawing illustrating an exemplary convertible cycling-stroller apparatus 200 in stroller mode. The convertible cycling-stroller apparatus 200 includes one or more wheels 201 and one or more wheels 202 each rotatably mounted on axle 203 and axle 204, respectively. Axle 203 is attached to the frame 205. Axle 204 is attached to the frame 206. A protective stroller bumper 207 is attached to frame 206. For example, the convertible cycling-stroller apparatus 200 may be configured as a stroller with two wheels 201 and one wheel 202, or alternatively, as a stroller with one wheel 201 and two wheels 202, or as another alternative, as a stroller with two wheels 201 and two wheels 202. The one or more wheels 201 and one or more wheels 202 may be of the same size diameter. In other embodiments, the one or more wheels 201 and one or more wheels 202 may be of the different sizes. The one or more wheels 201 and one or more wheels 202 may be, for example, 16, 20, 26, or 29 inches or larger in diameter, all of which are well known in the art and are commercially available. Typically, the wheels will include inflatable tires (not shown) that may be, for example, ½, 1, 2, 3, or 4 inches or larger in width, all of which are well known in the art and are commercially available.

A riding seat (not shown) is stored by attaching it to second frame 206. A drive mechanism 208 is coupled to one or more of the wheels 201 or 202, but is not used to power the convertible cycling-stroller apparatus 200 in stroller mode.

One or more handlebar posts 209 may be attached to a portion of frame 205, which are movable between the first and the second attachment orientations. The handlebar post 209 may be journaled in a handlebar post tube (not shown), as is known in the art. A carrier 210 may be attached to frame 205 or to handlebar post 209 for carrying a child and/or an object (e.g., carrier 210 may be a child seat, a shopping container, a flatbed, or a combination thereof). There may be at least one handlebar post 209 attached to the frame 205 that includes a single handlebar 209 with two individual mounting posts (not shown) separated by a space, wherein at least a portion of the carrier 210 is disposed in the space between the two individual mounting posts.

The carrier 210 may also include an adjustable canopy (not shown) extendable over the carrier 210. The carrier 210 may also include a child protective shield 211. In the embodiment shown in FIG. 2, the carrier 210 is in a rear-facing orientation with respect to the longitudinal axis of the frame 205 when the convertible cycling-stroller apparatus 200 is in the stroller orientation. The carrier 210 may be movable between a forward-facing orientation and rear-facing orientation with respect to the longitudinal axis of the frame 205.

Frame 205 and frame 206 are connected by a swivel (not shown). The frame 206 includes an extendable member (not shown). When the convertible cycling-stroller apparatus 200 is in the stroller mode as shown in FIG. 2, the extendable member is fully contracted. The extendable member may be extended and non-extended, for example, by hand or with the assistance of a mechanical device (e.g., a rack and pinion). The convertible cycling-stroller apparatus 200 also includes a drive mechanism 208 that includes a chainless shaft 212 including a variable three-speed transmission 213.

The convertible cycling-stroller apparatus 200 in FIG. 2 is in a walker-powered orientation powered by a walker (not shown). The convertible cycling-stroller apparatus 200 is steered by depressing on the handlebar 209, lifting the one or more rear wheels 202, and turning the vehicle in the desired direction.

Figure 3:
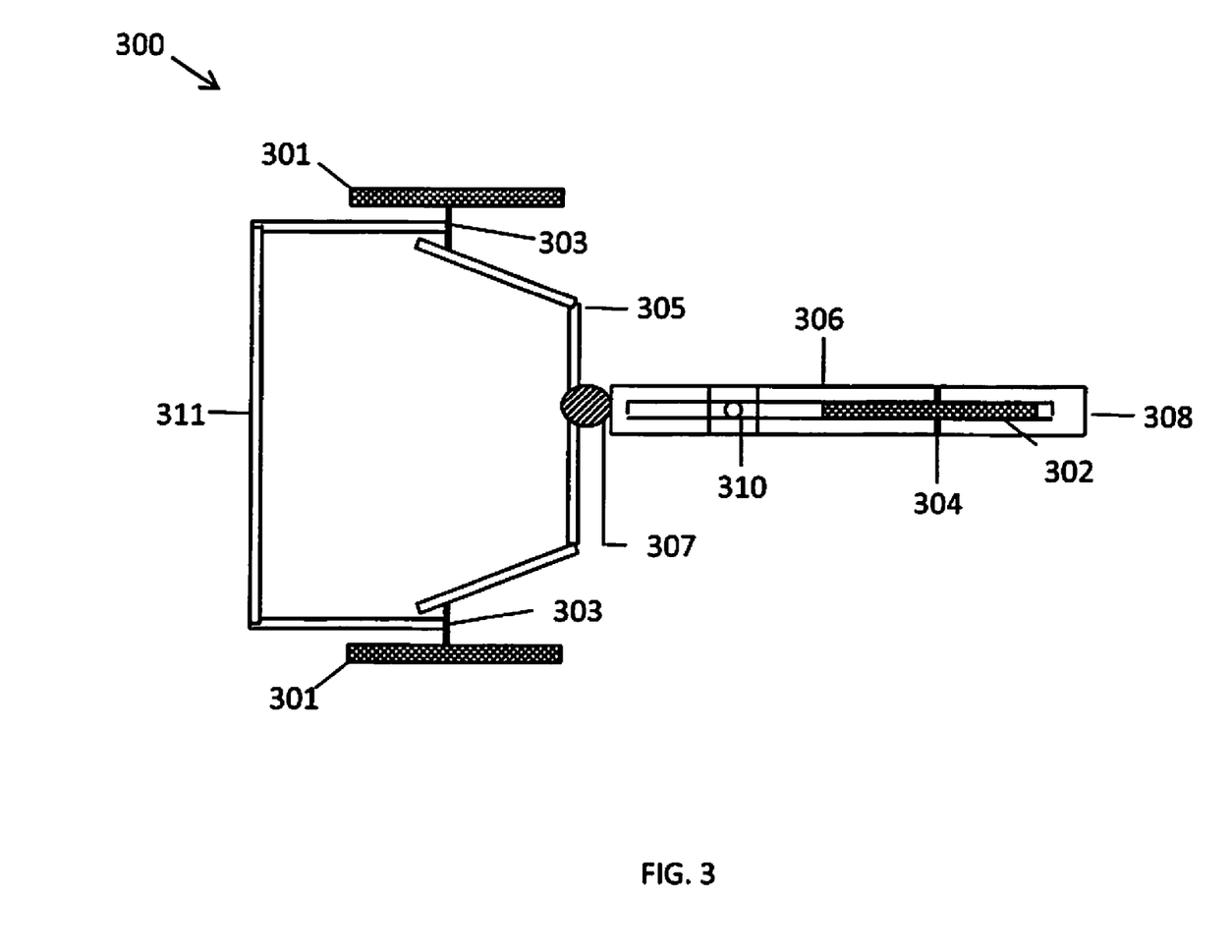
FIG. 3 is a top-view drawing illustrating an exemplary convertible cycling-stroller apparatus in stroller mode.

FIG. 3 is a top-view drawing illustrating an exemplary convertible cycling-stroller apparatus 300 in stroller mode. The convertible cycling-stroller apparatus 300 includes one or more wheels 301 and one or more wheels 302 each rotatably mounted on axle 303 and axle 304, respectively. Axle 303 is attached to the frame 305. Axle 304 is attached to the frame 306. The one or more wheels 301 and one or more wheels 302 may be of the same size diameter. In other embodiments, the one or more wheels 301 and one or more wheels 302 may be of the different sizes.

Frame 305 and frame 306 are connected by a swivel 307. The frame 306 includes an extendable member (not shown). The extendable member (not shown) may be extended and non-extended, for example, by hand or with the assistance of a mechanical device (e.g., a rack and pinion). A protective stroller bumper 308 is attached to frame 306.

A riding seat (not shown) is attached to frame 306 via a base plate 310. A handlebar 311 may be attached to a portion of frame 305, which is movable between the first and the second attachment orientations. The handlebar 311 may be journaled in a handlebar post tube (not shown), as is known in the art. A carrier (not shown) may be attached to frame 305 for carrying a child and/or an object (e.g., carrier (not shown) may be a child seat, a shopping container, a flatbed, or a combination thereof).

Figure 4:
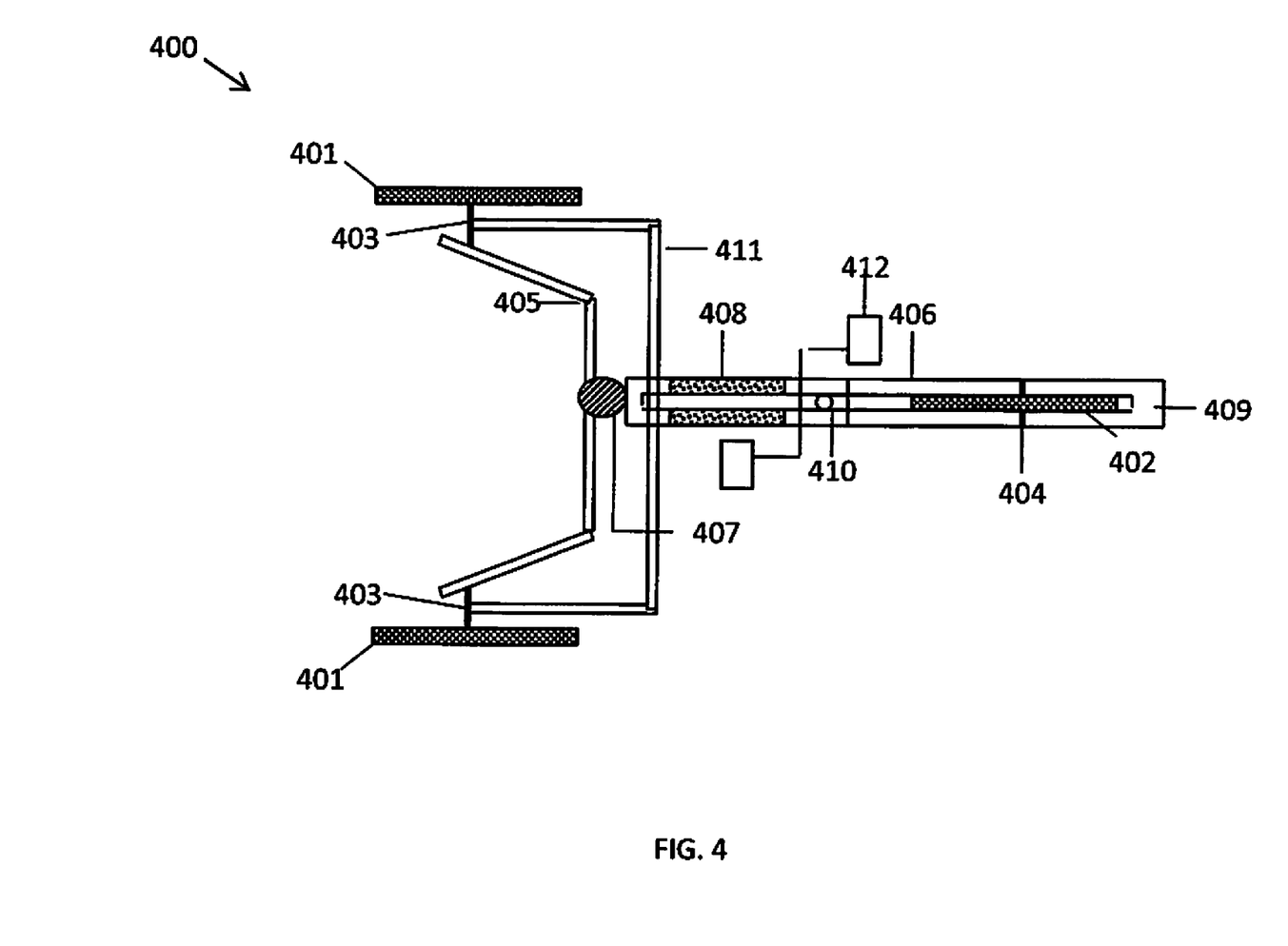
FIG. 4 is a top-view drawing illustrating an exemplary convertible cycling-stroller apparatus in travel mode.

FIG. 4 is a top-view drawing illustrating an exemplary convertible cycling-stroller apparatus 400 in travel mode. The convertible cycling-stroller apparatus 400 includes one or more wheels 401 and one or more wheels 402 each rotatably mounted on axle 403 and axle 404, respectively. The one or more wheels 401 and one or more wheels 402 may be of the same size diameter. In other embodiments, the one or more wheels 401 and one or more wheels 402 may be of the different sizes.

The frame 405 and a frame 406 are connected by a swivel 407. The frame 406 includes an extendable member 408. The extendable member 408 may be extended and non-extended, for example, by hand or with the assistance of a mechanical device (e.g., a rack and pinion). A protective stroller bumper 409 is attached to frame 406.

A riding seat (not shown) is attached to frame 406 via a base plate 410. A handlebar 411 may be attached to a portion of frame 405, which is movable between the first and the second attachment orientations. The handlebar 411 may be journaled in a handlebar post tube (not shown), as is known in the art. A carrier (not shown) may be attached to frame 405 for carrying a child and/or an object (e.g., carrier (not shown) may be a child seat, a shopping container, a flatbed, or a combination thereof). Pedals 412 are reversibly attached to frame 406.

Figure 5:
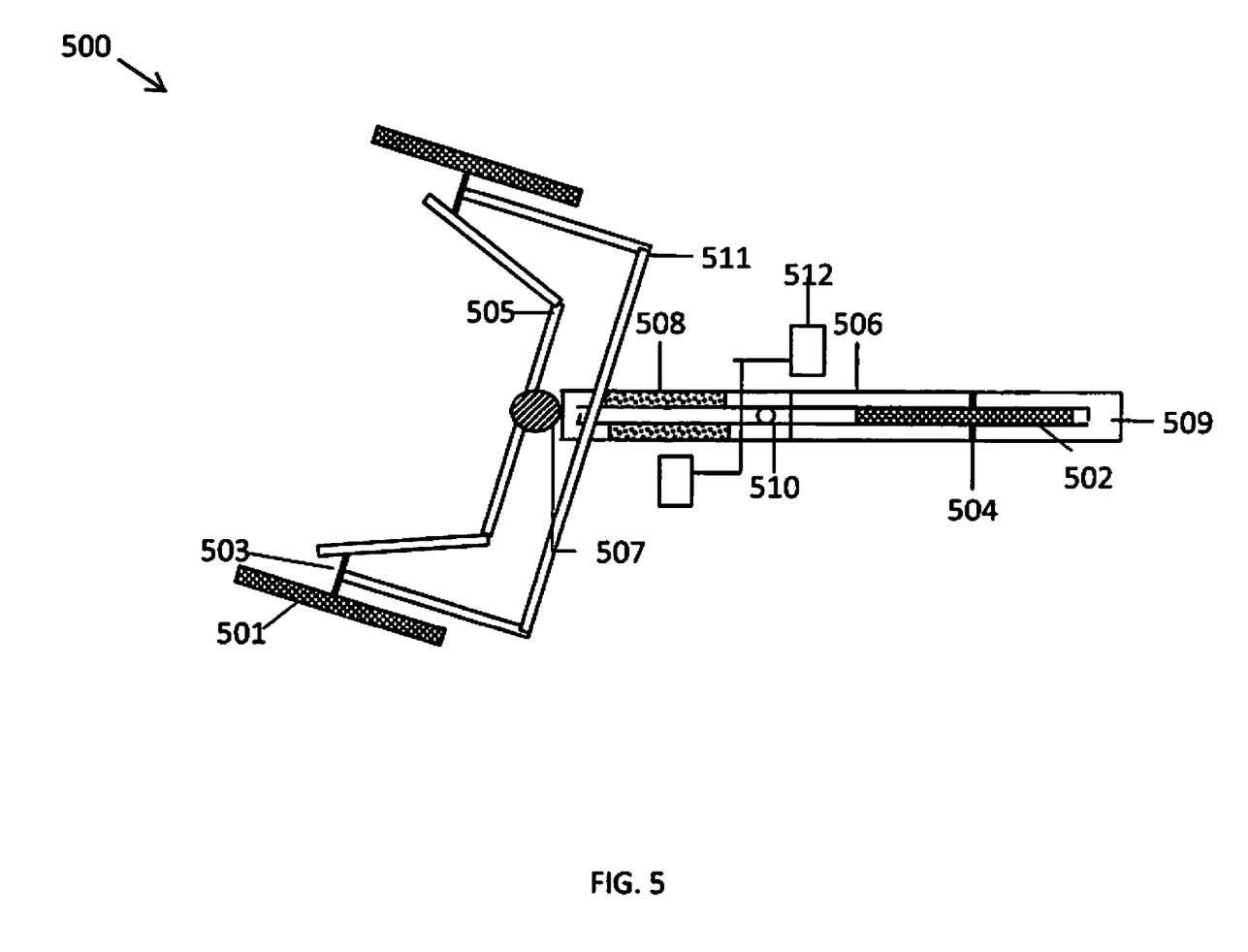
FIG. 5 is a top-view drawing illustrating an exemplary convertible cycling-stroller apparatus in travel mode and being steered by swiveling on its swivel.

FIG. 5 is a top-view drawing illustrating an exemplary convertible cycling-stroller apparatus 500 in travel mode and being steered by swiveling on its swivel. The convertible cycling-stroller apparatus 500 includes one or more wheels 501 and one or more wheels 502 each rotatably mounted on axle 503 and axle 504, respectively. Axle 503 is attached to the frame 505. Axle 504 is attached to the frame 506. The one or more wheels 501 and one or more wheels 502 may be of the same size diameter. In other embodiments, the one or more wheels 501 and one or more wheels 502 may be of the different sizes.

Frame 505 and frame 506 are connected by a swivel 507. The frame 506 includes an extendable member 508. The extendable member 508 may be extended and non-extended, for example, by hand or with the assistance of a mechanical device (e.g., a rack and pinion). A protective stroller bumper 509 is attached to frame 506.

A riding seat (not shown) is attached to frame 506 via a base plate 510. A handlebar 511 may be attached to a portion of frame 505, which is movable between the first and the second attachment orientations. The handlebar 511 may be journaled in a handlebar post tube (not shown), as is known in the art. A carrier (not shown) may be attached to frame 505 for carrying a child and/or an object (e.g., carrier (not shown) may be a child seat, a shopping container, a flatbed, or a combination thereof). Pedals 512 are reversibly attached to frame 506.

Figure 6:
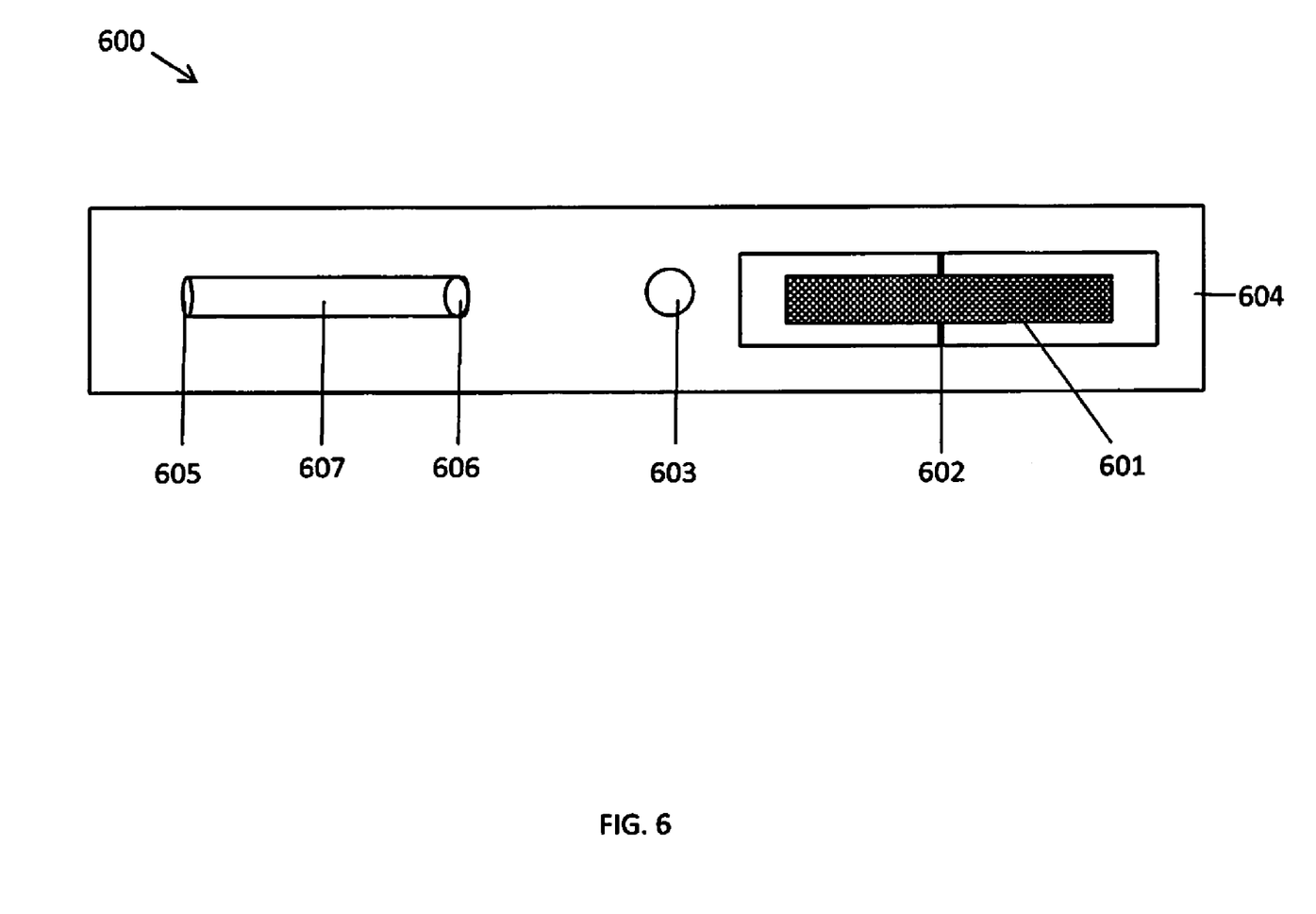
FIG. 6 is a top-view drawing illustrating an exemplary second frame for an exemplary convertible cycling-stroller apparatus.

FIG. 6 is a top-view drawing illustrating an exemplary second frame 600 for an exemplary convertible cycling-stroller apparatus. The second frame 600 includes one or more rear wheels 601 each rotatably mounted on axle 602. A riding seat (not shown) is attached to the second frame 600 via a base plate 603. A protective stroller bumper 604 is attached to frame 600. On the underside of second frame 600 are a first locking position 605 and a second locking position 606 and the groove 607.

When the first frame (not shown) is connected via a swivel (not shown) to the first locking position 605, the convertible cycling-stroller apparatus in travel mode with second frame 600 fully extended. One or more locking pins (not shown) are used to secure the second frame 600 in the tricycle mode. To convert the convertible cycling-stroller apparatus to the stroller-mode, the one or more locking pins (not shown) are disengaged from the second frame 600, the swivel (not shown) is disconnected from the first locking position 605 and moved in or along the groove 607 to the second locking position 606, for example, by hand or with the assistance of a mechanical device (e.g., a rack and pinion), and the one or more locking pins (not shown) are engaged to the second frame 600 to secure the convertible cycling-stroller apparatus in stroller mode.

Figure 7:
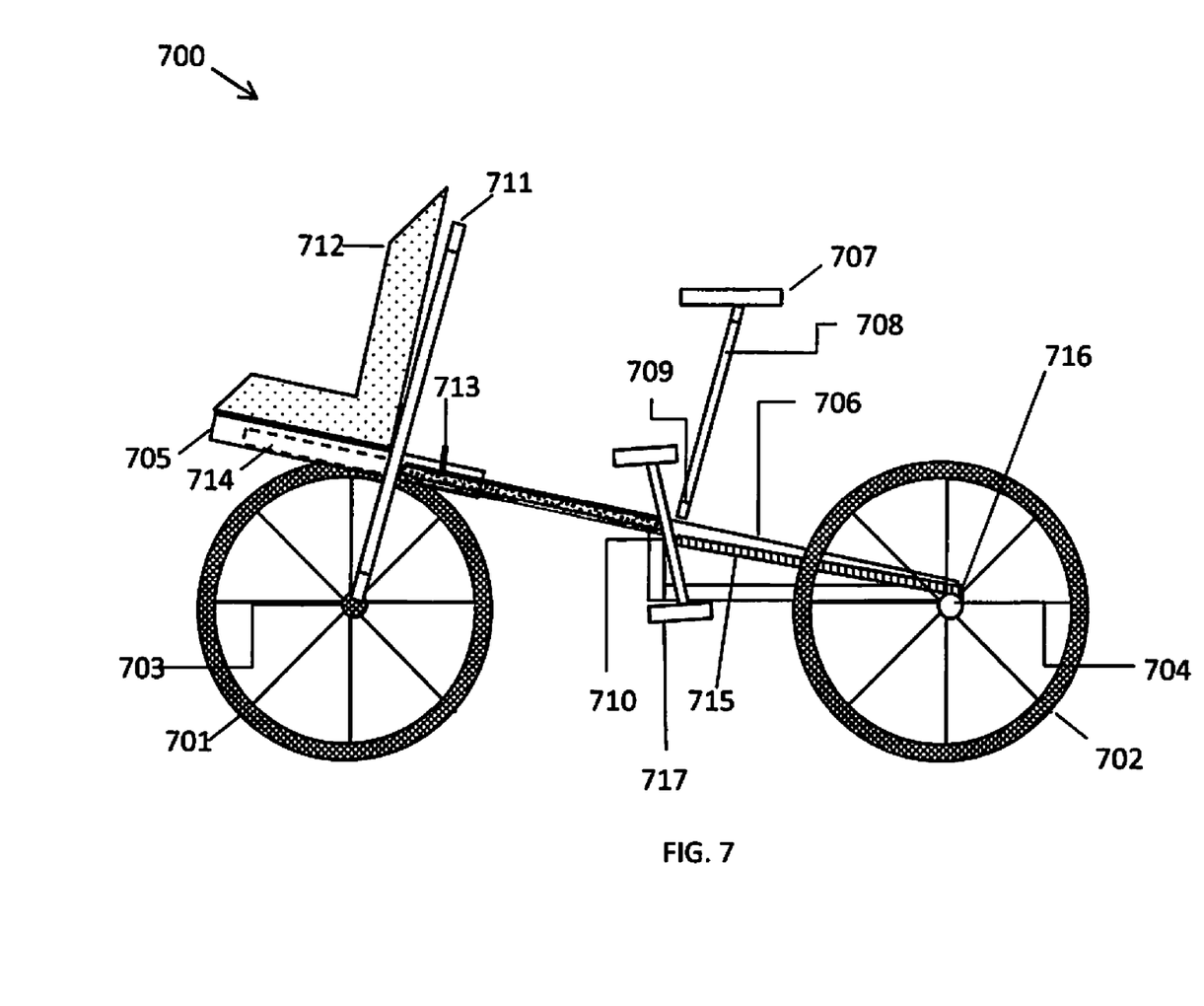
FIG. 7 is a side-view drawing illustrating an exemplary convertible cycling-stroller apparatus in travel mode.

FIG. 7 is a side-view drawing illustrating an exemplary convertible cycling-stroller apparatus 700 in travel mode. The convertible cycling-stroller apparatus 700 includes one or more wheels 701 and one or more wheels 702 each rotatably mounted on axle 703 and axle 704, respectively. Axle 703 is attached to the frame 705. Axle 704 is attached to the frame 706. In one embodiment, the convertible cycling-stroller apparatus 700 may be configured as a stroller with two wheels 701 and one wheel 702, or alternatively, as a stroller with one wheel 701 and two wheels 702, or as another alternative, as a stroller with two wheels 701 and two wheels 702. The one or more wheels 701 and one or more wheels 702 may be of the same size diameter. In other embodiments, the one or more wheels 701 and one or more wheels 702 may be of the different sizes. The one or more wheels 701 and one or more wheels 702 may be, for example, 16, 20, 26, or 29 inches or larger in diameter, all of which are well known in the art and are commercially available. Typically, the wheels will include inflatable tires (not shown) that may be, for example, ½, 1, 2, 3, or 4 inches or larger in width, all of which are well known in the art and are commercially available.

A riding seat 707 may be attached to frame 706, such as by means of a seat post 708 slidingly mounted on a tube 709, as is extremely well known in the art. A drive mechanism 710 is coupled to one or more of the wheels 701 or 702 for driving the cycling apparatus, such as a pedal, gear, and chain drive, which is extremely well known in the art.

One or more handlebar posts 711 may be attached to a portion of frame 705, which are movable between the first and the second attachment orientations. The handlebar post 711 may be journaled in a handlebar post tube (not shown), as is known in the art. A carrier 712 may be attached to frame 705 or to handlebar post 711 for carrying a child and/or an object (e.g., carrier may be a child seat, a shopping container, a flatbed, or a combination thereof). There may be at least one handlebar post 711 attached to the frame 705 that includes a single handlebar 711 with two individual mounting posts (not shown) separated by a space, wherein at least a portion of the carrier 712 is disposed in the space between the two individual mounting posts.

The carrier 712 may also include an adjustable canopy (not shown) extendable over the carrier 712. In the embodiment shown in FIG. 7, the carrier 712 is in a forward-facing orientation with respect to the longitudinal axis of the frame 705 when the convertible cycling-stroller apparatus 700 is in the tricycle orientation. The carrier 712 may be movable between a forward-facing orientation and rear-facing orientation with respect to the longitudinal axis of the frame 705.

Frame 705 and frame 706 are connected by a swivel 713. The frame 705 includes a cavity 714 that can accept the front portion of frame 706. When the convertible cycling-stroller apparatus 700 is in the tricycle mode as shown in FIG. 7, the front portion of frame 706 is partially or completely pulled out of cavity 714. When the convertible cycling-stroller apparatus 700 is in the stroller mode, the front portion of frame 706 is partially or completely inserted into cavity 714. The insertion of the front portion of frame 706 is partially or completely into cavity 714 may be performed, for example, by hand or with a mechanical device (e.g., a rack and pinion). The convertible cycling-stroller apparatus 700 also includes a drive mechanism 710 that includes a chainless shaft 715 including a variable speed transmission 716.

The convertible cycling-stroller apparatus 700 in FIG. 7 is in a rider-powered orientation powered by a rider (not shown)

sitting on seat 707 and powering the drive mechanism 710 by spinning the pedals 717, as is typically done with a regular diamond frame bicycle or tricycle. The pedals 717 may be typical flat bicycle pedals, downhill-type pedals with protruding spikes, clip-less pedals, or cage-type pedals, all of which are well known in the art and are commercially available. The swivel 713 at the intersection of the frame 705 and the frame 706 provides for steering of the convertible cycling-stroller apparatus 700.

Figure 8:
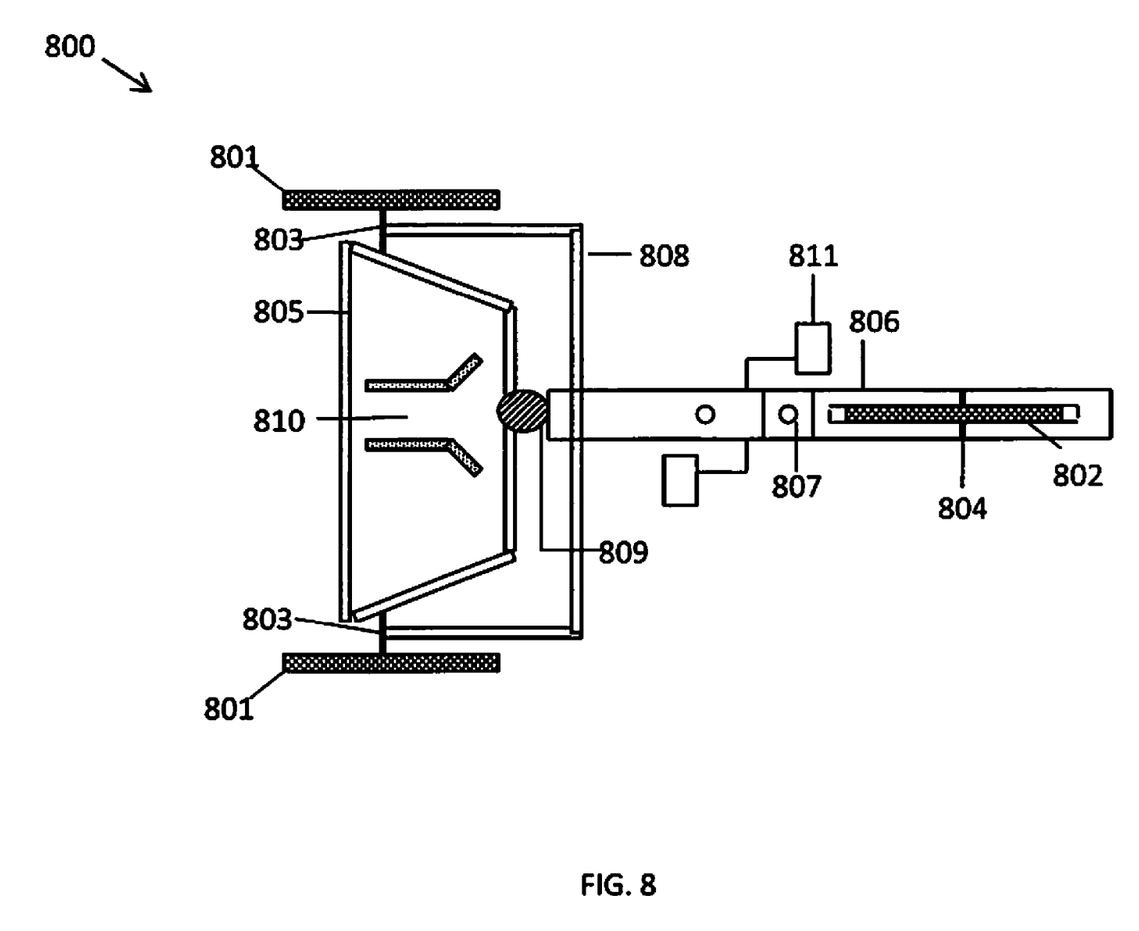
FIG. 8 is a top-view drawing illustrating an exemplary convertible cycling-stroller apparatus in travel mode.

FIG. 8 is a top-view drawing illustrating an exemplary convertible cycling-stroller apparatus 800 in travel mode. The convertible cycling-stroller apparatus 800 includes one or more wheels 801 and one or more wheels 802 each rotatably mounted on axle 803 and axle 804, respectively. Axle 803 is attached to the frame 805. Axle 804 is attached to the frame 806. The convertible cycling-stroller apparatus 800 may be configured as a stroller with two wheels 801 and one wheel 802, or alternatively, as a stroller with one wheel 801 and two wheels 802, or as another alternative, as a stroller with two wheels 801 and two wheels 802. The one or more wheels 801 and one or more wheels 802 may be of the same size diameter. In other embodiments, the one or more wheels 801 and one or more wheels 802 may be of the different sizes. The one or more wheels 801 and one or more wheels 802 may be, for example, 16, 20, 26, or 29 inches or larger in diameter, all of which are well known in the art and are commercially available. Typically, the wheels will include inflatable tires (not shown) that may be, for example, ½, 1, 2, 3, or 4 inches or larger in width, all of which are well known in the art and are commercially available.

A riding seat (not shown) may be attached to frame 806, such as by means of a seat post (not shown) slidingly mounted in a tube 807, as is extremely well known in the art. A drive mechanism (not shown) is coupled to one or more of the wheels 801 or 802 for driving the cycling apparatus, such as a pedal, gear, and chain drive, which is extremely well known in the art.

One or more handlebar posts 808 may be attached to a portion of frame 805, which are movable between the first and the second attachment orientations. The handlebar post 808 may be journaled in a handlebar post tube (not shown), as is known in the art. A carrier (not shown) may be attached to frame 805 or to handlebar post 808 for carrying a child and/or an object (e.g., carrier (not shown) may be a child seat, a shopping container, a flatbed, or a combination thereof). There may be at least one handlebar post 808 attached to the frame 805 that includes a single handlebar 808 with two individual mounting posts (not shown) separated by a space, wherein at least a portion of the carrier (not shown) is disposed in the space between the two individual mounting posts.

The carrier (not shown) may also include an adjustable canopy (not shown) extendable over the carrier (not shown). In the embodiment shown in FIG. 8, the carrier (not shown) is in a forward-facing orientation with respect to the longitudinal axis of the frame 805 when the convertible cycling-stroller apparatus 800 is in the tricycle orientation. The carrier (not shown) may be movable between a forward-facing orientation and rear-facing orientation with respect to the longitudinal axis of the frame 805.

Frame 805 and frame 806 are connected by a swivel 809. The frame 805 includes a guide 810 that can accept the front portion of frame 806. When the convertible cycling-stroller apparatus 800 is in the tricycle mode as shown in FIG. 8, the front portion of frame 806 is partially or completely pulled out of guide 810. When the convertible cycling-stroller apparatus 800 is in the stroller mode, the front portion of frame 806 is partially or completely inserted into guide 810. The insertion of the front portion of frame 806 is partially or completely into guide 810 may be performed, for example, by hand or with a mechanical device (e.g., a rack and pinion). The convertible cycling-stroller apparatus 800 also includes a drive mechanism (not shown) that includes a chainless shaft (not shown) including a variable speed transmission (not shown) (not shown).

The convertible cycling-stroller apparatus 800 in FIG. 8 is in a rider-powered orientation powered by a rider (not shown) sitting on seat (not shown) and powering the drive mechanism (not shown) by spinning the pedals 811, as is typically done with a regular diamond frame bicycle or tricycle. The pedals 811 may be typical flat bicycle pedals, downhill-type pedals with protruding spikes, clip-less pedals, or cage-type pedals, all of which are well known in the art and are commercially available. The swivel 809 at the intersection of the frame 805 and the frame 806 provides for steering of the convertible cycling-stroller apparatus 800.

Furthermore, in the claims provided herein, specified steps may be carried out concurrently unless explicit claim language requires that they be carried out separately or as parts of different processing operations. For example, a claimed step of doing X and a claimed step of doing Y may be conducted simultaneously within a single operation, and the resulting process will be covered by the claim. Thus, a step of doing X, a step of doing Y, and a step of doing Z may be conducted simultaneously within a single process step, or in two separate process steps, or in three separate process steps, and that process will still fall within the four corners of a claim that recites those three steps.

Similarly, except as explicitly required by claim language, a single substance or component may meet more than a single functional requirement, provided that the single substance fulfills the more than one functional requirement as specified by claim language.

All patents, patent applications, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Additionally, all claims in this application, and all priority applications, including but not limited to original claims, are hereby incorporated in their entirety into, and form a part of, the written description of the invention. Applicants reserve the right to physically incorporate into this specification any and all materials and information from any such patents, applications, publications, scientific articles, web sites, electronically available information, and other referenced materials or documents. Applicants reserve the right to physically incorporate into any part of this document, including any part of the written description, the claims referred to above including but not limited to any original claims.

What is claimed is:

1. A vehicle comprising:
    a two-part frame comprising a first frame and a second frame, wherein the first frame and the second frame are separated by at least one swivel that allows for a side-to-side motion with respect to the longitudinal axis of the two-part frame, wherein the second frame comprises a member movable between a non-extended orientation and an extended orientation on the second frame or a member movable between a non-extended orientation and an extended orientation in a cavity or a guide on the first frame;

at least one wheel each rotably mounted on at least one axle on the first frame;

at least one wheel each rotably mounted on at least one axle on the second frame;

a riding seat reversibly attached to the second frame;

a drive mechanism coupled to the at least one wheel each rotably mounted on the at least one axle on the first frame or to the at least one wheel each rotably mounted on the at least one axle on the second frame for driving the vehicle;

at least one handlebar post attached to the first frame; and a carrier attachable to the first frame for carrying at least one human, at least one package, or a combination thereof therein, wherein the vehicle is in a tricycle orientation when the member is in the extended orientation and is drivable by a rider sitting on the seat and steering the vehicle with the at least one handlebar post, wherein the vehicle is in a stroller orientation when the member is in the non-extended orientation and is drivable by a walker steering the vehicle with the at least one handlebar post.

2. The vehicle of claim 1, wherein the carrier is movable between a forward-facing orientation and a rear-facing orientation with respect to the longitudinal axis of the first frame.

3. The vehicle of claim 1, wherein the vehicle in the tricycle orientation is steered by turning the first frame on the swivel.

4. The vehicle of claim 1, wherein the vehicle in the stroller orientation is steered by depressing on the handlebar, lifting the front wheel, and turning the vehicle in the desired direction.

5. The vehicle of claim 1, wherein the drive mechanism is a chainless shaft comprising a variable speed transmission.

6. The vehicle of claim 1, wherein the drive mechanism is coupled to the at least one wheel each rotably mounted on the at least one axle on the second frame for driving the vehicle.

7. The vehicle of claim 1, wherein the at least one handlebar post attached to the first frame comprises a single handlebar with two individual mounting posts separated by a space, wherein at least a portion of the carrier is disposed in the space between the two individual mounting posts.

8. The vehicle of claim 1, wherein the at least one handlebar post comprises two individual mounting posts separated by a space, wherein at least a portion of the carrier is disposed in the space between the two individual mounting posts.

9. The vehicle of claim 1, wherein the vehicle in the tricycle orientation comprises two front wheels each rotably mounted on the at least one axle on the first frame and one wheel each rotably mounted on the at least one axle on the second frame.

10. The vehicle of claim 1, wherein the at least one swivel that allows for a side-to-side motion with respect to the longitudinal axis of the two-part frame does not allow for an up-or-down motion with respect to the longitudinal axis of the two-part frame when moving from extended orientation to the non-extended orientation.

11. A convertible cycling-stroller apparatus comprising:

a two-part frame comprising a first frame and a second frame, wherein the first frame and the second frame are separated by at least one swivel that allows for a side-to-side motion with respect to the longitudinal axis of the two-part frame, wherein the second frame comprises a member movable between a non-extended orientation and an extended orientation on the second frame or a member movable between a non-extended orientation and an extended orientation in a cavity or a guide on the first frame;

at least one wheel each ratably mounted on at least one axle on the first frame;

at least one wheel each rotably mounted on at least one axle on the second frame;

a riding seat reversibly attached to the second frame;

a drive mechanism coupled to the at least one wheel each rotably mounted on the at least one axle on the second frame for driving the convertible cycling-stroller apparatus, wherein the drive mechanism is a chainless shaft comprising a variable speed transmission;

at least one handlebar post attached to the first frame; and a carrier attachable to the first frame for carrying at least one human, at least one package, or a combination thereof therein, wherein the convertible cycling-stroller apparatus is in a tricycle orientation when the member is in the extended orientation and is drivable by a rider sitting on the seat, powering the drive mechanism, and steering the convertible cycling-stroller apparatus with the at least one handlebar post, wherein the convertible cycling-stroller apparatus is in a stroller orientation when the member is in the non-extended orientation and is drivable by a walker steering the convertible cycling-stroller apparatus with the at least one handlebar post.

12. The convertible cycling-stroller apparatus of claim 11, wherein the convertible cycling-stroller apparatus in the tricycle orientation is steered by turning the first frame on the at least one swivel.

13. The convertible cycling-stroller apparatus of claim 11, wherein the at least one handlebar post attached to the first frame comprises a single handlebar with two individual mounting posts separated by a space, wherein at least a portion of the carrier is disposed in the space between the two individual mounting posts.

14. The convertible cycling-stroller apparatus of claim 11, wherein the convertible cycling-stroller apparatus comprises two front wheels each rotably mounted on the at least one axle on the first frame and one wheel rotably mounted on the at least one axle on the second frame.

15. The convertible cycling-stroller apparatus of claim 11, wherein the at least one handlebar post spatially translates with respect to the longitudinal axis of the first frame between the tricycle orientation and the stroller orientation.

16. The convertible cycling-stroller apparatus of claim 11, wherein the member is movable between the non-extended orientation and the extended orientation on the second frame by hand or with the assistance of a mechanical device.

17. The convertible cycling-stroller apparatus of claim 11, wherein the member is movable between the non-extended orientation and the extended orientation in the cavity or the guide on the first frame by hand or with the assistance of a mechanical device.

18. The convertible cycling-stroller apparatus of claim 11, wherein the at least one swivel that allows for a side-to-side motion with respect to the longitudinal axis of the two-part frame does not allow for an up-or-down motion with respect to the longitudinal axis of the two-part frame when moving from extended orientation to the non-extended orientation.

19. A convertible tricycle-stroller apparatus comprising:

a two-part frame comprising a first frame and a second frame, wherein the first frame and the second frame are separated by at least one swivel that allows for a side-to-side motion with respect to the longitudinal axis of the two-part frame, wherein the second frame comprises a member movable between a non-extended orientation and an extended orientation on the second frame or a member movable between a non-extended orientation and an extended orientation in a cavity or a guide on the first frame;

at least one wheel each rotably mounted on at least one axle on the first frame;

at least one wheel each rotably mounted on at least one axle on the second frame;

a riding seat reversibly attached to the second frame;

a drive mechanism coupled to the at least one wheel each rotably mounted on the at least one axle on the second frame for driving the convertible tricycle-stroller apparatus, wherein the drive mechanism is a chainless shaft comprising a variable speed transmission;

at least one handlebar post attached to the first frame; and a carrier attachable to the first frame for carrying at least one human, at least one package, or a combination thereof therein, wherein the convertible tricycle-stroller apparatus is in a tricycle orientation when the member is in the extended orientation and is drivable by a rider sitting on the seat, powering the drive mechanism, and steering the convertible tricycle-stroller apparatus with the at least one handlebar post, wherein the convertible tricycle-stroller apparatus is in a stroller orientation when the member is in the non-extended orientation and is drivable by a walker steering the convertible tricycle-stroller apparatus with the at least one handlebar post, wherein the convertible tricycle-stroller apparatus in the tricycle orientation is steered by turning the first frame on the at least one swivel, wherein the at least one handlebar post attached to the first frame comprises a single handlebar with two individual mounting posts separated by a space, wherein at least a portion of the carrier is disposed in the space between the two individual mounting posts, wherein the convertible tricycle-stroller apparatus comprises two front wheels each rotably mounted on the at least one axle on the first frame and one wheel rotably mounted on the at least one axle on the second frame, wherein the at least one swivel that allows for a side-to-side motion with respect to the longitudinal axis of the two-part frame does not allow for an up-or-down motion with respect to the longitudinal axis of the two-part frame when moving from extended orientation to the non-extended orientation.

20. The convertible tricycle-stroller apparatus of claim 19, wherein the member is movable between the non-extended orientation and the extended orientation in the cavity or the guide on the first frame by hand or with the assistance of a mechanical device.

* * * * *